(12) United States Patent
Kulbida

(10) Patent No.: US 10,747,371 B1
(45) Date of Patent: Aug. 18, 2020

(54) DETECTION OF FINGER PRESS FROM LIVE VIDEO STREAM

(71) Applicant: Konica Minolta Business Solutions U.S.A., Inc., San Mateo, CA (US)

(72) Inventor: Jie Kulbida, Broomfield, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 0 days.

(21) Appl. No.: 16/457,449

(22) Filed: Jun. 28, 2019

(51) Int. Cl.
| | |
|---|---|
| *G06F 3/042* | (2006.01) |
| *G06K 9/00* | (2006.01) |
| *G06K 9/46* | (2006.01) |
| *G06F 3/0484* | (2013.01) |
| *G06T 7/194* | (2017.01) |
| *G06T 7/246* | (2017.01) |

(52) U.S. Cl.
CPC ........ *G06F 3/0425* (2013.01); *G06F 3/04842* (2013.01); *G06K 9/00355* (2013.01); *G06K 9/00375* (2013.01); *G06K 9/4604* (2013.01); *G06K 9/4652* (2013.01); *G06T 7/194* (2017.01); *G06T 7/246* (2017.01); *G06T 2200/24* (2013.01); *G06T 2207/10016* (2013.01); *G06T 2207/10024* (2013.01); *G06T 2207/30196* (2013.01)

(58) Field of Classification Search
CPC ... G06F 3/0425; G06F 3/04842; G06T 7/246; G06T 7/194; G06T 2207/10016; G06T 2207/10024; G06T 2207/30196; G06T 2200/24; G06K 9/00375; G06K 9/4652; G06K 9/00355; G06K 9/4604
See application file for complete search history.

(56) References Cited

U.S. PATENT DOCUMENTS

| | | | |
|---|---|---|---|
| 8,325,234 B2 | 12/2012 | Kii | |
| 9,030,425 B2 | 5/2015 | Stafford | |
| 9,582,070 B2 | 2/2017 | Kadantseva et al. | |
| 2011/0029185 A1 | 2/2011 | Aoki et al. | |
| 2012/0113241 A1* | 5/2012 | Sundaresan | G06F 3/017 348/77 |
| 2014/0253429 A1* | 9/2014 | Dai | G06F 3/017 345/156 |

(Continued)

OTHER PUBLICATIONS

Pandey, Amar Prakash (Nov. 15, 2018). Finger Detection and Tracking using OpenCV and Python [PDF file]. Retrieved May 28, 2019, from https://dev.to/amarlearning/finger-detection-and-tracking-using-opencv-and-python-586m (19 pages).

*Primary Examiner* — Ryan A Lubit
(74) *Attorney, Agent, or Firm* — Osha Liang LLP

(57) ABSTRACT

A method to detect a finger press in an augmented reality (AR) workspace. The method includes obtaining, using an image sensor, an image of the AR workspace, where the image includes an icon of a graphic user interface (GUI), where the GUI is hovered over by a hand of a user, extracting, by a computer processor based at least on a skin tone color filter, a hand candidate from the image of the AR workspace, extracting, by the computer processor based on a pre-determined confidence measure, a finger candidate from a contour of the hand candidate, and detecting, by the computer processor based on a location of the finger candidate with respect to the icon of the GUI, the finger press performed by the hand of the user.

17 Claims, 10 Drawing Sheets

(56) References Cited

U.S. PATENT DOCUMENTS

2014/0292648 A1 10/2014 Matsuda et al.
2015/0186039 A1* 7/2015 Ide ..................... G06F 3/0425
                                                    345/168
2016/0054859 A1* 2/2016 Oshima ............... G06F 3/0425
                                                    345/175

* cited by examiner

US 10,747,371 B1

DETECTION OF FINGER PRESS FROM LIVE VIDEO STREAM

BACKGROUND

Augmented Reality (AR) allows a user to interact with a computer-generated AR output overlaid on or around objects in a real-world environment. In some cases, the computer-generated AR output may be projected into the real-world environment such that the user does not have to hold a smartphone or wear AR glasses. Often, the user's experience is improved when the AR system captures the user's intent with minimal or no direct interaction with a computer interface.

SUMMARY

In general, in one aspect, the invention relates to a method to detect a finger press in an augmented reality (AR) workspace. The method includes obtaining, using an image sensor, an image of the AR workspace, wherein the image comprises an icon of a graphic user interface (GUI), wherein the GUI is hovered over by a hand of a user, extracting, by a computer processor based at least on a skin tone color filter, a hand candidate from the image of the AR workspace, extracting, by the computer processor based on a pre-determined confidence measure, a finger candidate from a contour of the hand candidate, and detecting, by the computer processor based on a location of the finger candidate with respect to the icon of the GUI, the finger press performed by the hand of the user.

In general, in one aspect, the invention relates to a non-transitory computer readable medium (CRM) storing computer readable program code to detect a finger press in an augmented reality (AR) workspace. The computer readable program code, when executed by a computer processor, includes functionality for obtaining, using an image sensor, an image of the AR workspace, wherein the image comprises an icon of a graphic user interface (GUI), wherein the GUI is hovered over by a hand of a user, extracting, based at least on a skin tone color filter, a hand candidate from the image of the AR workspace, extracting, based on a pre-determined confidence measure, a finger candidate from a contour of the hand candidate, and detecting, based on a location of the finger candidate with respect to the icon of the GUI, the finger press performed by the hand of the user.

In general, in one aspect, the invention relates to a system for detecting a finger press in an augmented reality (AR) workspace. The system includes a memory and a computer processor coupled to the memory and that obtains, using an image sensor, an image of the AR workspace, wherein the image comprises an icon of a graphic user interface (GUI), wherein the GUI is hovered over by a hand of a user, extracts, based at least on a skin tone color filter, a hand candidate from the image of the AR workspace, extracts, based on a pre-determined confidence measure, a finger candidate from a contour of the hand candidate, and detects, based on a location of the finger candidate with respect to the icon of the GUI, the finger press performed by the hand of the user.

Other aspects of the invention will be apparent from the following description and the appended claims.

DETAILED DESCRIPTION

Figure 1:
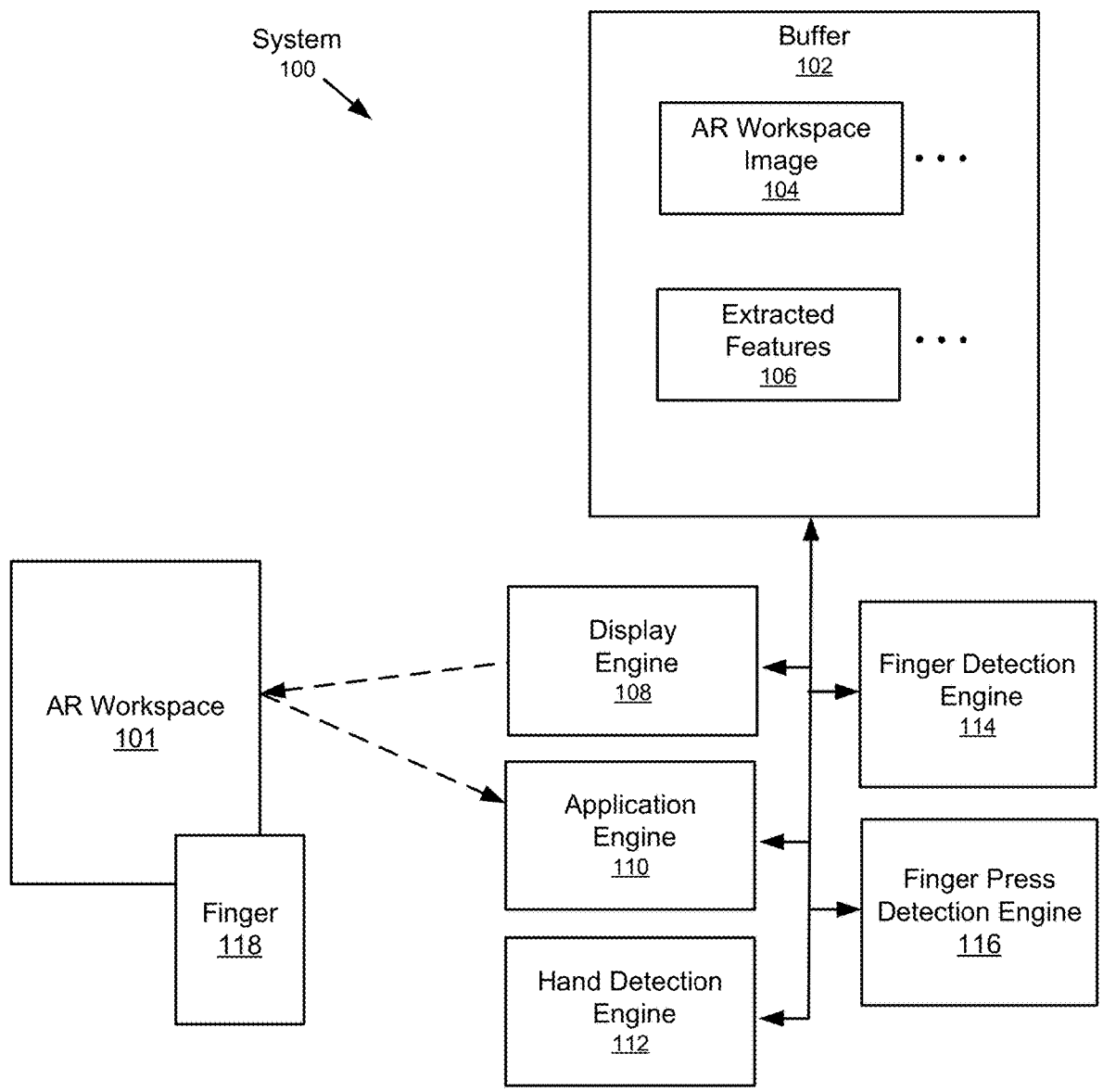
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for detecting a user's finger press on a projected user interface of an application, using the real-time imagery captured by a camera of an augmented reality system. By analyzing image sequences captured by the camera, a user's finger(s) (or gesture in general) are detected to infer the user's interaction (e.g., finger press) with the projected user interface. The application may include a software application and/or a machinery that perform actions based on the result of the inference, without relying on dedicated devices such as a mouse or touch sensors. The technique involves the optical detection of one or more human fingers and the analysis of the optically detected fingers' position and velocity. The application receives a notification when a finger press is optically detected within the projected user interface. In one or more embodiments of the invention, the projected user interface is projected by an optical projector that is integrated with the camera. The integrated device including the optical projector and the camera is referred to as a Projection with Interactive Capture (PIC) device.

FIG. 1 shows a system in accordance with one or more embodiments of the invention. As shown in FIG. 1, the system (100) has multiple components, and may include, for example, a buffer (102), a display engine (108), an application engine (110), a hand detection engine (112), a finger detection engine (114), and a finger press detection engine (116). Each of these components (102, 108, 110, 112, 114, and 116) may be located on the same computing device (e.g., a personal computer (PC), laptop, tablet PC, smartphone, multifunction peripheral, kiosk, server, or Projection with Interactive Capture (PIC) device) or on different computing devices connected by a network of any size having wired and/or wireless segments. Each of these components is discussed below.

The buffer (102) may be implemented in hardware (i.e., circuitry), software, or any combination thereof. The buffer (102) is configured to store an AR workspace image (104) and extracted features (106) of the AR workspace image (104). Multiple AR workspace images (104) and/or multiple sets of extracted features (106) may be stored in the buffer (102). In one or more embodiments, the AR workspace image (104) is an image of an AR workspace (101). The AR workspace (101) may be a surface of any type (e.g., a desk, a wall, a whiteboard, or a floor). Further, the AR workspace (101) may comprise a mat, multiple work surfaces, irregular surfaces, or spatially separated surfaces, but is not particularly limited to these configurations. The AR workspace image (104) may be saved in the buffer (102) in any imaging format (e.g., a JPEG image, a GIF image, a bitmap image, a TIFF image, or a PDF document).

The AR workspace image (104) may be a single image or multiple images. For example, multiple AR workspace images (104) may correspond an AR workspace (101) that is recorded over time during a live video stream (e.g., a sequence of image frames that are simultaneously recorded and transmitted by an imager). In other words, each of the AR workspace images (104) may correspond to a frame of the live video stream. Throughout this disclosure, the term "frame" refers to an AR workspace image in a live video stream.

The AR workspace image (104) includes a captured image of a projected graphical user interface (GUI) of a software application or a machinery used by a user. For example, the GUI may be optically projected onto the AR workspace (101) and optically captured into the AR workspace image (104). To interact with the software application or to control the machinery, the user may hover a hand over the GUI projected onto the AR workspace (101). In particular, a finger (118) of the user may hover over an icon projected onto the AR workspace (101) as part of the GUI. The AR workspace image (104) may also include an image of a portion of the user's hand such as the finger (118) or a portion of the finger (118). One or more AR workspace image (104) captured without any foreground object, such as the user's hand hovering over the AR workspace (101), is a background image. In one or more embodiments, the background image is an average of multiple AR workspace images (104) captured without any foreground object. An example of the AR workspace image (104) with the finger (118) over the projected GUI is depicted in FIG. 3A.

Figure 3A:
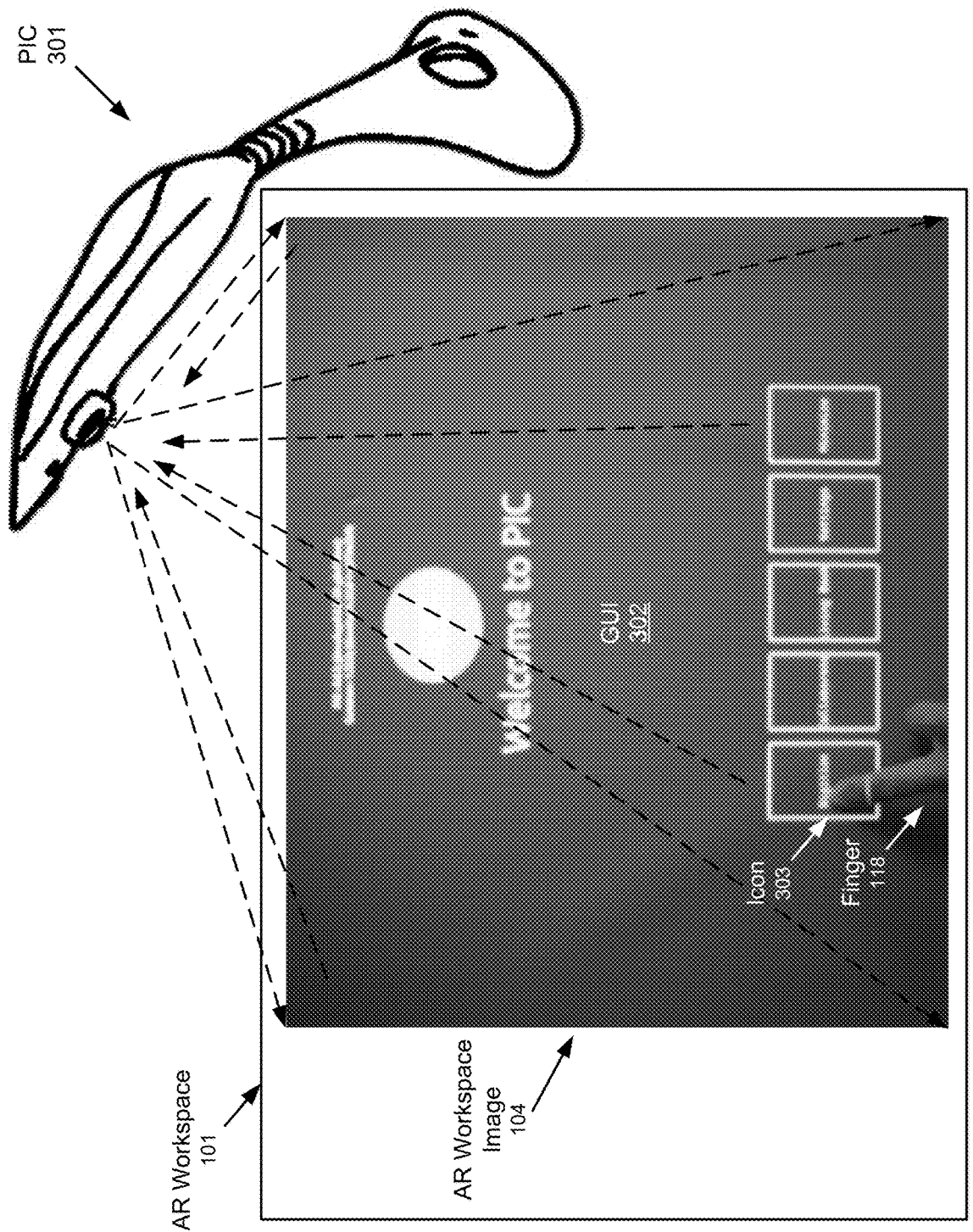
FIGS. 3A-3D show an implementation example in accordance with one or more embodiments of the invention.

In particular, FIG. 3A shows an example AR workspace image in accordance with one or more embodiments of the invention. As shown in FIG. 3A, a Projection with Interactive Capture (PIC) device (301) includes an imaging component (e.g., a 2-dimensional and/or 3-dimensional imager) and a projection component (e.g., an optical projector). The projection component projects the GUI (302) onto the AR workspace (101) such that the imaging component captures the AR workspace image (104). In particular, the AR workspace image (104) includes an image of an icon (303) of the GUI (302) with the finger (118) hovered over the icon (303).

Returning to the discussion of FIG. 1, the extracted features (106) may include extracted content of the AR workspace image (104) and/or characteristics derived from the extracted content. For example, the extracted features (106) may include a filtered image, a converted image, color and/or luminance parameters of the filtered or converted image, a geometric shape and/or outline detected from the filtered or converted image, but are not particularly limited to these items. In general, the extracted features (106) include information relating to the finger (118) that hovers over the projected GUI.

The extracted features (106) are generated and/or used by the hand detection engine (112), the finger detection engine (114), and the finger press detection engine (116) to detect a finger press on the projected GUI. Examples of the extracted features (106) include a hand candidate, a finger candidate, and a fingertip trajectory that are described below in more detail in reference to FIGS. 3B-3D.

As discussed above, the system (100) includes the display engine (108). The display engine (108) may be implemented in hardware (i.e., circuitry), software, or any combination thereof. The display engine (108) is configured to project, using one or more lights and/or effects, an AR output image onto a surface of the AR workspace (101). In one or more embodiments, the AR output image is the projected GUI described above.

The display engine (108) may include a 2-dimensional (2D) and/or 3-dimensional (3D) optical projector that is able to project a digital image onto the AR workspace (101). The display engine (108) may operate in a visible wavelength regime (e.g., color or monochrome).

As discussed above, the system (100) includes the application engine (110). The application engine (110) may be implemented in hardware (i.e., circuitry), software, or any combination thereof. The application engine (110) may be part of an application software or a machinery used by the user to cause the application software or machinery to perform a task for the user.

In response to the application engine (110) rendering a GUI, the display engine (108) may project the GUI within a region of the AR workspace (101). The size and shape of the region of the AR workspace (101) may be determined by the display engine (108) and/or the application engine (110).

The display engine (108) may project one or more icons within the GUI, such as a virtual indicator (e.g., status indicator) or virtual control (e.g., button, scroll bar, switch, and knob) that facilitates user interaction with the application engine. In other words, the virtual indicator or virtual control may allow the user to navigate and manipulate the features of the application software or the machinery to complete the aforementioned task for the user.

As discussed above, the system (100) includes the hand detection engine (112). The hand detection engine (112) may be implemented in hardware (i.e., circuitry), software, or any combination thereof. The hand detection engine (112) is configured to image the AR workspace (101) to generate the AR workspace image (104). For example, the hand detection engine (112) may include a 2D and/or 3D imager (e.g., a camera or a combination of one or more cameras) having an image sensor in order to capture a digital image of the AR workspace (101). Further, the hand detection engine (112) is configured to analyze the AR workspace image (104) to generate a hand candidate that represents the user's hand. In one or more embodiments, the hand detection engine (112) generates the hand candidate using the method described below in reference to FIGS. 2A-2C. An example of the hand candidate generated by the hand detection engine (112) is depicted in FIGS. 3B-3C.

Figure 3B:
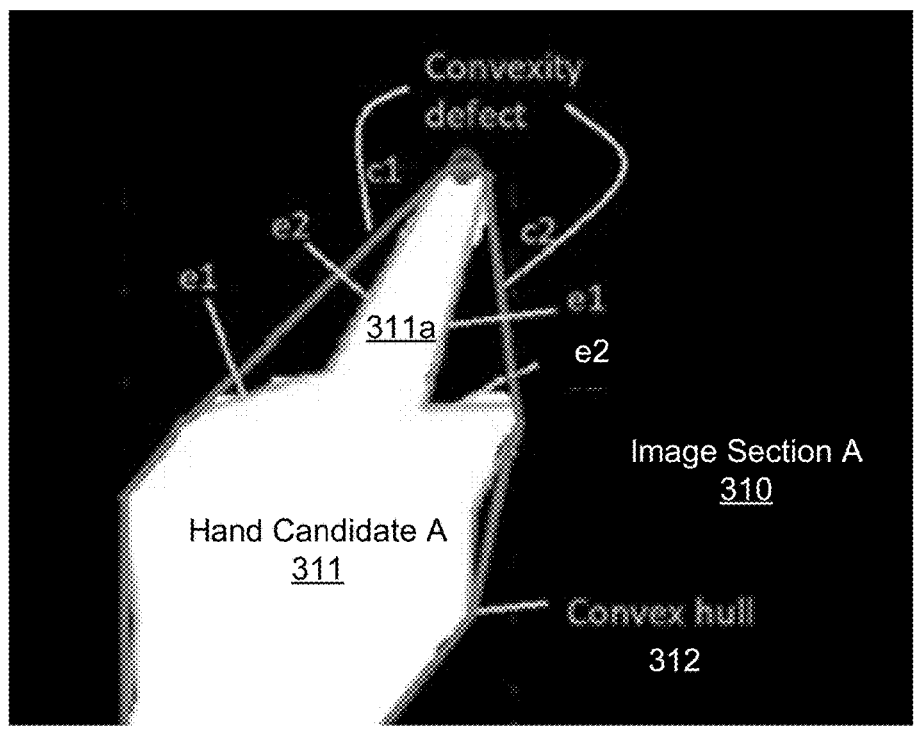

In particular, FIG. 3B shows an example hand candidate A (311) in an image section A (310) within one of the AR workspace images (104). The hand candidate A (311) is bound by a convex hull (312). Two convexity defects labeled as c1 and c2, in addition to other unlabeled trivial convexity defects (explained below), exist between the hand candidate A (311) (more specifically, the exterior contour of the hand candidate A (311)) and the convex hull (312). In particular, the convexity defect c1 includes two adjoining edges that are joined at a vertex to form a concave angle deviating from the convex hull (312). The vertex lies on the contour of the hand candidate A (311), and the two edges are linear approximations of the contour surrounding the vertex. Each edge is terminated by the vertex on one end and by the intersection between the convex hull and the contour on the other end. Similarly, the convexity defect c2 includes two adjoining edges that are joined at another vertex to form another concave angle deviating from the convex hull (312). The leading edge in each convexity defect along the counter-clockwise order is referred to as the edge e1 of the convexity defect. In contrast, the trailing edge in each convexity defect along the counter-clockwise order is referred to as the edge e2 of the convexity defect. Accordingly, the edge e2 of the convexity defect c1 and the edge e1 of the convexity defect c2 are adjacent to one another.

Figure 3C:
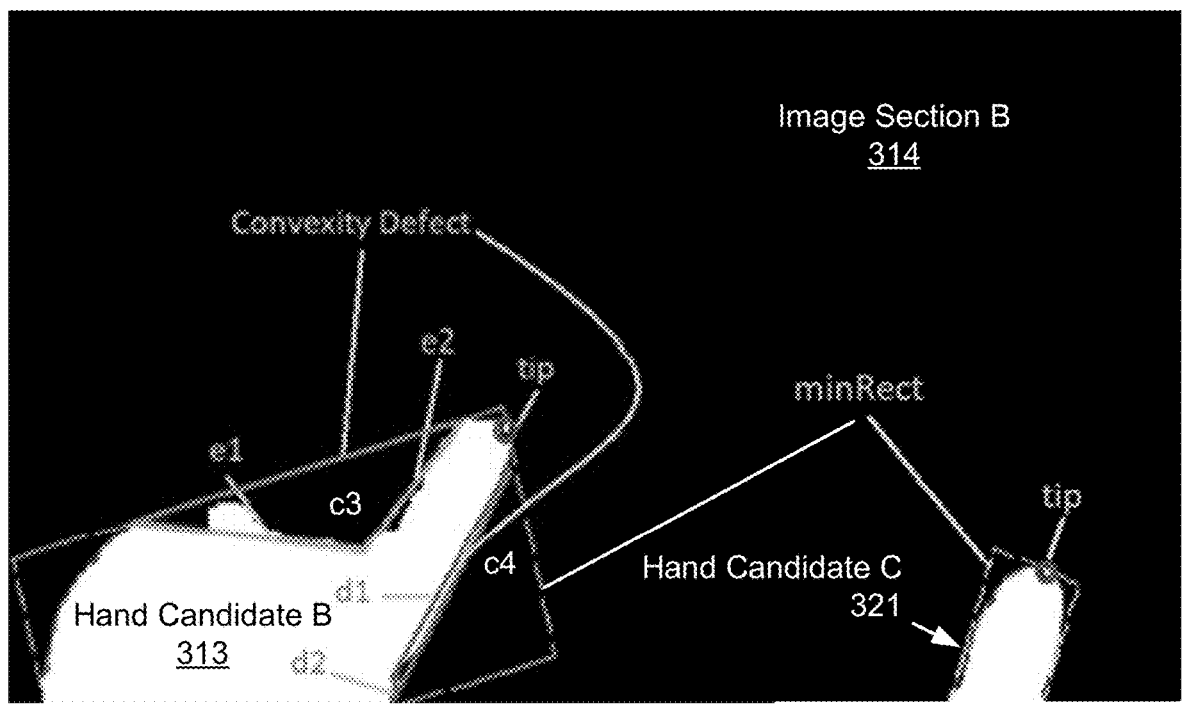

FIG. 3C shows an example of a hand candidate B (313) in an image section B (314) within another one of the AR workspace images (104). For example, the image section A (311) and the image section B (314) may be within two different AR workspace images (104) that are captured at two different points in time. Specifically, the hand candidate A (311) and the hand candidate B (314) correspond to different postures of the user's hand at the two different points in time.

As shown in FIG. 3C, two convexity defects labeled c3 and c4, in addition to other unlabeled trivial convexity defects, exist between the hand candidate B (314) and the corresponding convex hull. In particular, each of the convexity defects c3 and c4 includes two adjoining edges that are joined at a vertex to form a concave angle deviating from the convex hull. The lengths of the two edges of convexity defect c4 are denoted as d1 and d2. In each of the convexity defects c1, c2, c3, and c4 above, the vertex and two endpoints of e1 and e2 that are away from the vertex collectively define a triangle. The height of the triangle from the vertex to the opposing side is referred to as the depth of the convexity defect.

Returning to the discussion of FIG. 1, the system (100) includes the finger detection engine (114). The finger detection engine (114) may be implemented in hardware (i.e., circuitry), software, or any combination thereof. Further, the finger detection engine (114) is configured to analyze the hand candidate within the AR workspace image (104) to generate a finger candidate representing the finger (118) of the user. In one or more embodiments, the finger detection engine (114) generates the finger candidate using the method described below in reference to FIGS. 2A and 2D. An example of the finger candidate generated by the finger detection engine (114) is depicted in FIGS. 3B and 3C.

In particular, in FIGS. 3B and 3C, for each of c1, c2, and c3, the length of each of e1 and e2 exceeds a pre-set minimum length. Further, the depth of each of c1, c2, and c3 also exceeds a pre-set minimum depth. Meeting both the pre-set minimum length and pre-set minimum depth qualifies each of c1, c2, and c3 as a valid convex defect. In contrast, the length d2 of c4 is less than the pre-set minimum length and the depth of c4 is less than the pre-set minimum depth. Failing to meet either of the pre-set minimum length criterion or the pre-set minimum depth disqualifies c4 as a valid convex defect. In other words, c4 is a trivial convex defect.

FIG. 3B shows a pair of adjacent valid convex defects c1 and c2, where e2 of defect c1 and e1 of defect c2 are adjacent to each other. Based on the distance between the adjacent edges of the adjacent convex defects c1 and c2 being within a pre-set maximum finger width threshold, the adjacent edges of the adjacent convex defects c1 and c2 define a finger candidate (311a). In one or more embodiments, the finger candidate (311a) is determined using the method described in below reference to FIG. 2D.

In contrast to FIG. 3B, FIG. 3C shows the hand candidate B (313) with the single valid convex defect c3, and the hand candidate C (321) having no valid convex defect. In both hand candidates, the minimum bounding rectangle of each hand candidate is denoted as "minRect." Accordingly, a fingertip, denoted as "tip," is found as an intersection between the contour of the hand candidate and the minRect. In one or more embodiments, the fingertip denoted as "tip" is determined using the method described below in reference to FIG. 2D.

Returning to the discussion of FIG. 1, in one or more embodiments, the system (100) includes the finger press detection engine (116). The finger detection press engine (116) may be implemented in hardware (i.e., circuitry), software, or any combination thereof. Further, the finger press detection engine (116) is configured to analyze the finger candidate within the AR workspace image (104) to detect a finger press of the user. In one or more embodiments, the finger press detection engine (116) detects the finger press using the method described below in reference to FIGS. 2A and 2E. An example of the finger press detected by the finger press detection engine (116) is depicted in FIG. 3D.

Figure 2E:
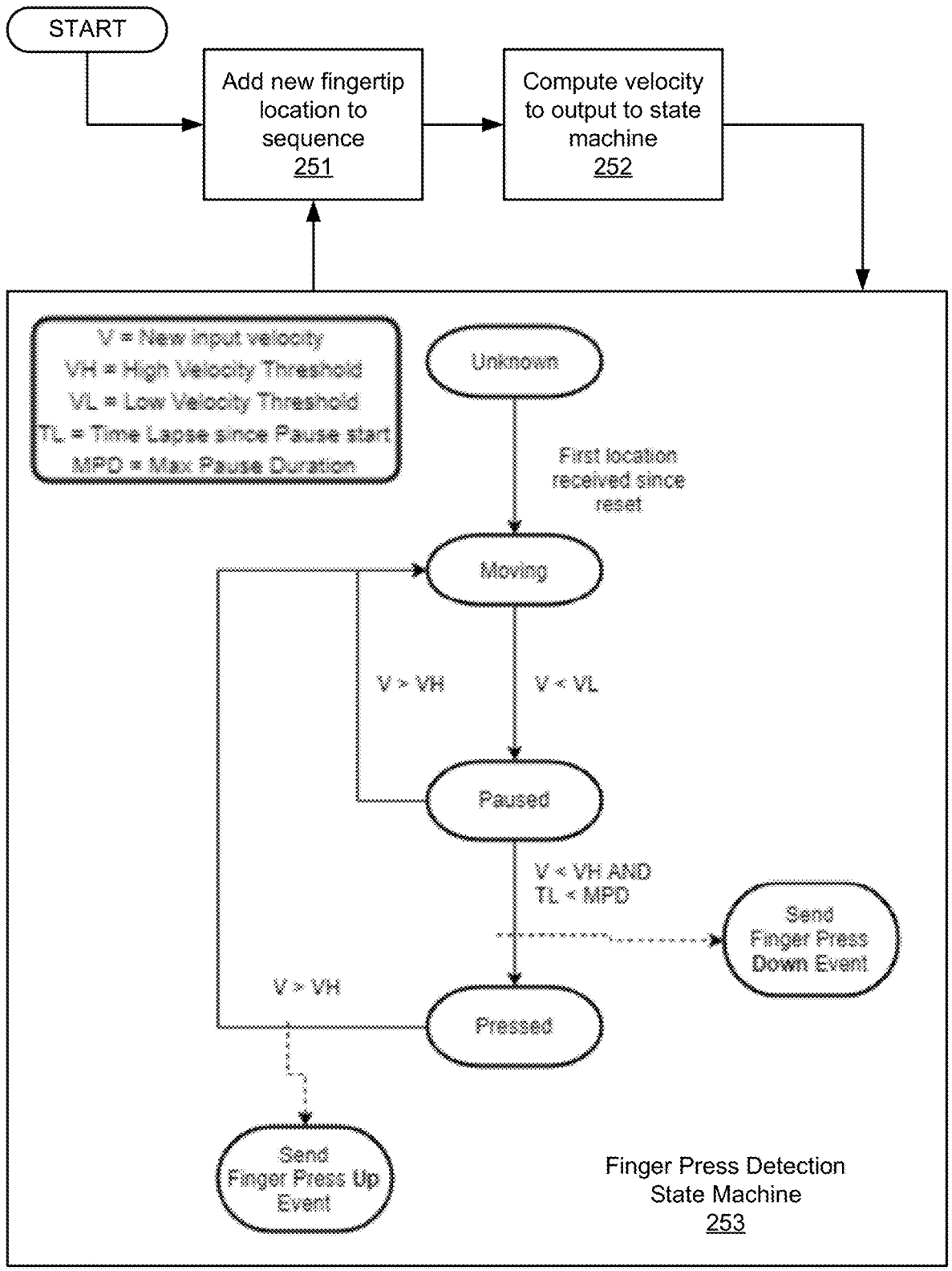
Figure 3D:
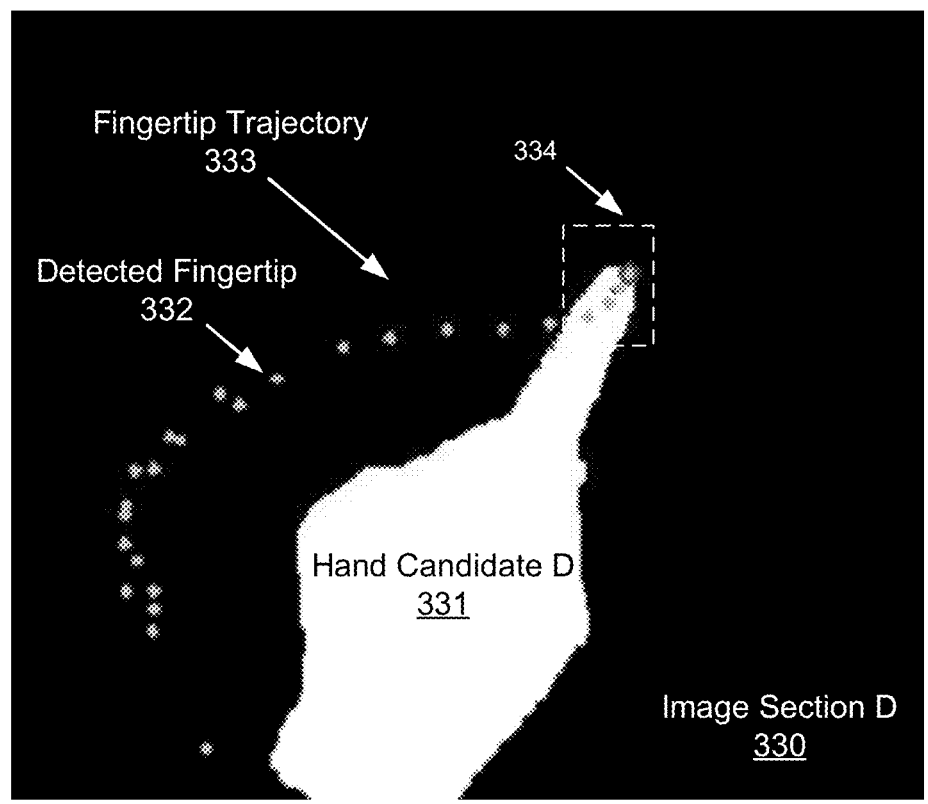

In particular, FIG. 3D shows an image section D (330) superimposed with a sequence of detected fingertips (e.g., detected fingertip (332)) forming a fingertip trajectory (333). Specifically, each detected fingertip corresponds to a single white dot in FIG. 3D such that the sequence of white dots corresponds to the sequential fingertip trajectory. The distance between two adjacent detected fingertips in the fingertip trajectory (333) corresponds to the velocity of the user's finger movement. Within the location (334), each distance between adjacent detected fingertips falls below a pre-set minimum. In other words, the user's finger movement slows or pauses within location (334). Accordingly, the user's finger movement imaged within the location (334) is determined as the finger press. In one or more embodiments, the method described below in reference to FIG. 2E is used to determine the finger press based on the user's finger movement velocity.

Although the system (100) described above is shown as having six components (102, 108, 110, 112, 114, and 116), in other embodiments of the invention, the system (100) may have more or fewer components. Furthermore, the functionality of each component described above may be shared among multiple components. In addition, each component (102, 108, 110, 112, 114, and 116) may be utilized multiple times in serial or parallel to carry out an iterative operation.

FIGS. 2A-2E show method flowcharts for detecting a finger press in an AR workspace in accordance with one or more embodiments of the invention. One or more of the steps in FIGS. 2A-2E may be performed by the components of the system (100), discussed above in reference to FIG. 1. In one or more embodiments of the invention, one or more of the steps shown in FIGS. 2A-2E may be omitted, repeated, and/or performed in a different order than the order shown in FIGS. 2A-2E. Accordingly, the scope of the invention should not be considered limited to the specific arrangement of steps shown in FIGS. 2A-2E.

Figure 2A:
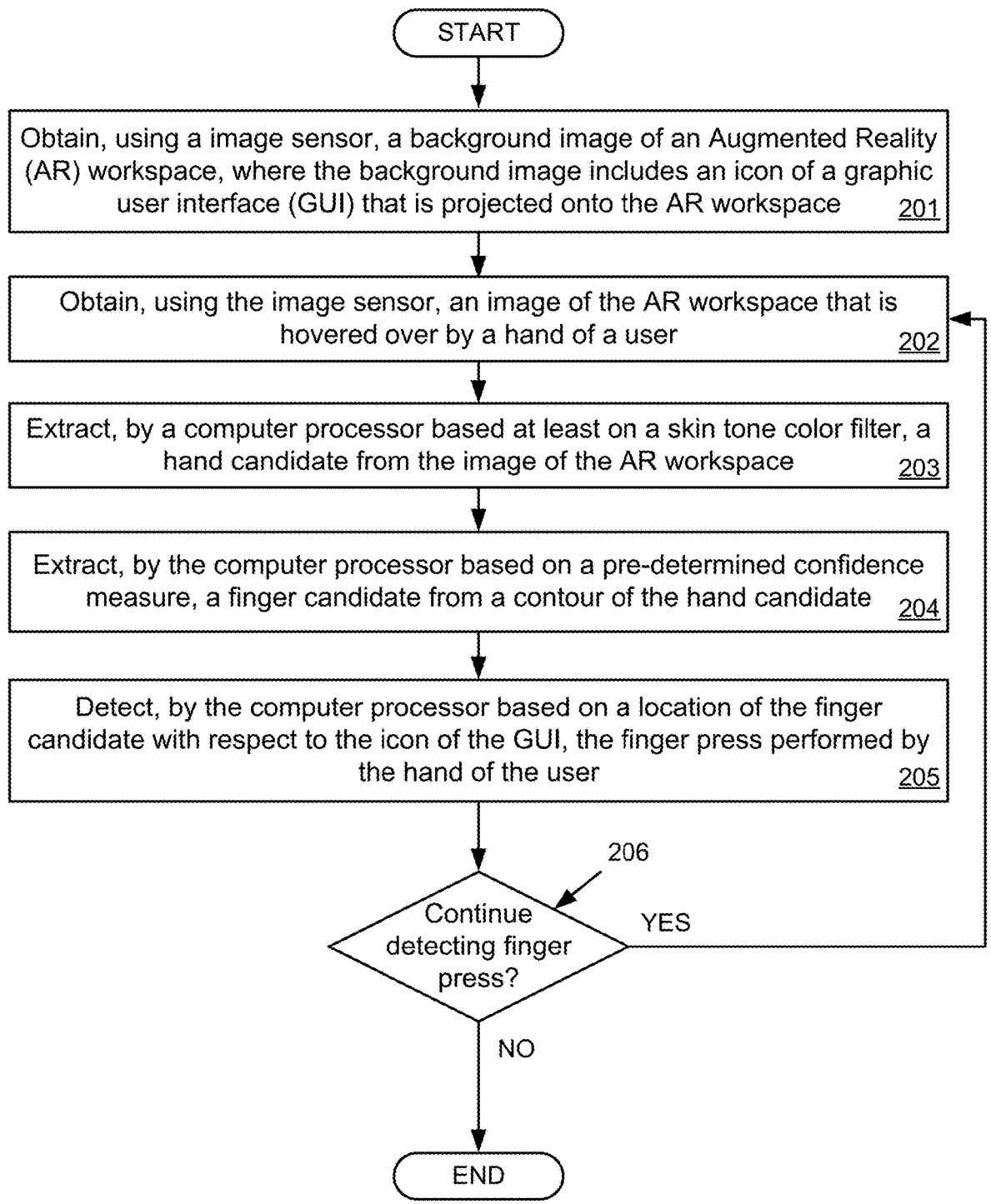
FIGS. 2A-2E show method flowcharts in accordance with one or more embodiments of the invention.

Referring to FIG. 2A, initially in Step 201, a background image of the AR workspace is obtained using an image sensor. In one or more embodiments, the background image includes an icon of a graphic user interface (GUI). For example, the GUI may be projected onto the AR workspace using an optical projector. Example details of Step 201 are described below in reference to FIG. 2B.

In Step 202, an image of the AR workspace where a hand of a user (i.e., a user's hand) hovers over the AR workspace is obtained using the image sensor. In particular, in addition to the GUI, the image also includes a projection of a portion of the hand of the user. In one or more embodiments, the image is part of a sequence of images such as a live video stream that records the user's finger hovering over the AR workspace. For example, the image is a frame of the live video stream transmitted from the image sensor simultaneously with the recoding. In particular, the sequence of images, or the live video stream, are captured and analyzed by iterating Step 203 through Step 206 as described below.

In Step 203, a hand candidate is extracted, by a computer processor based at least on a skin tone color filter, from the image of the AR workspace. In one or more embodiments, extracting the hand candidate includes comparing the image and the background image to generate a foreground mask, and extracting, using a pre-determined skin tone filter and based on white balance parameters of the background image, connected color components from the image. In particular, the hand candidate is selected from the connected color components based on a pre-determined dimension criterion. Example details of Step 203 are described below in reference to FIG. 2C.

In Step 204, a finger candidate is extracted, by the computer processor based on a pre-determined confidence measure, from a contour of the hand candidate. In one or more embodiments, extracting the finger candidate is based on extracting convex defects from the contour of the hand candidate. In one or more embodiments, the pre-determined confidence measure is based on comparing a distance between adjacent convex defects and a pre-determined finger width threshold. For example, the finger candidate corresponds to a pair of adjacent convex defects with a corresponding distance being within the pre-determined finger width threshold. In one or more embodiments, the pre-determined confidence measure is further based on a finger quality measure, a fingertip quality measure and a presence of a neighboring finger candidate.

Multiple finger candidates may be extracted from the contour of the hand candidate and individual confidence scores of each finger candidate are computed based on the pre-determined confidence measure. Accordingly, a dominant finger candidate is selected from the finger candidates based on the individual confidence scores. For example, the dominant finger candidate may be selected as the finger candidate having the highest confidence score. Example details of Step 204 are described below in reference to FIG. 2D.

In Step 205, the finger press performed by the hand of the user is detected by the computer processor based on a location of the finger candidate with respect to the icon of the GUI. For example, if the finger candidate is detected as hovering over the GUI and pausing within the particular icon, a notification of the finger press on the particular icon is sent to the application. Accordingly, the application performs a pre-determine task corresponding to the particular icon. In one or more embodiments, the velocity of the finger hovering over the GUI is computed from a sequence of locations of the finger candidates extracted from the sequence of recorded images (from a live video stream) of the AR workspace. The pause is determined based on the velocity of the finger slowing down within a local area. Example details of Step 205 are described below in reference to FIG. 2E.

In Step 206, a determination is made as to whether finger press detection should be continued. If the determination is positive, i.e., the finger press detection is to be continued, the method returns to Step 202 where the next image in the sequence is obtained. If the determination is negative, i.e., the finger press detection is not to be continued, the method ends.

Figure 2B:
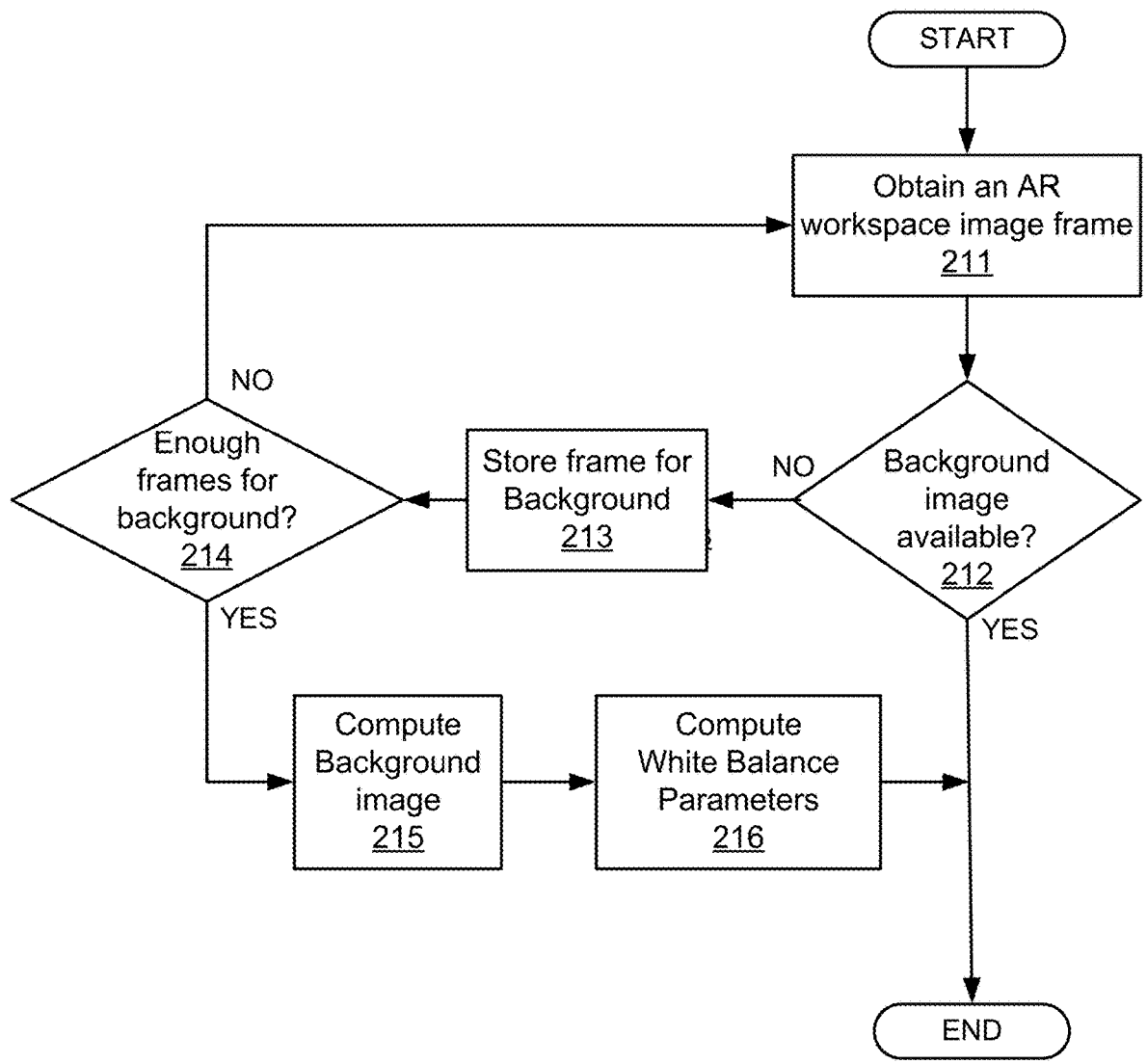

FIG. 2B shows example details of Step 201 depicted in FIG. 2A above. In one or more embodiments, during an initialization process of the system (100) when the AR workspace is free of any foreground objects, a background image is obtained by averaging N number of AR workspace image frames, where N is typically set to 5. White balance parameters are calculated from the background image so that underlying RGB components are equalized.

Referring to FIG. 2B, initially in Step 211, an AR workspace image is obtained, e.g., as a frame in a live video stream that is recording the AR workspace.

In Step 212, it is checked whether a background image is already available. If the background image is already available, the method ends. If the background image is not yet available, the obtained frame is stored (Step 213).

In Step 214, it is checked to see if enough frames have been stored for computing the background image. If enough frames are not available, the method returns to Step 211. If enough frames are available, the background image is computed, e.g., by averaging pixel values of the stored frames (Step 215).

In Step 216, white balance parameters are computed from the background image. For example, as discussed above in FIG. 1, the computed white balance parameters may be stored in the buffer (102) as part of the extracted features (106).

Figure 2C:
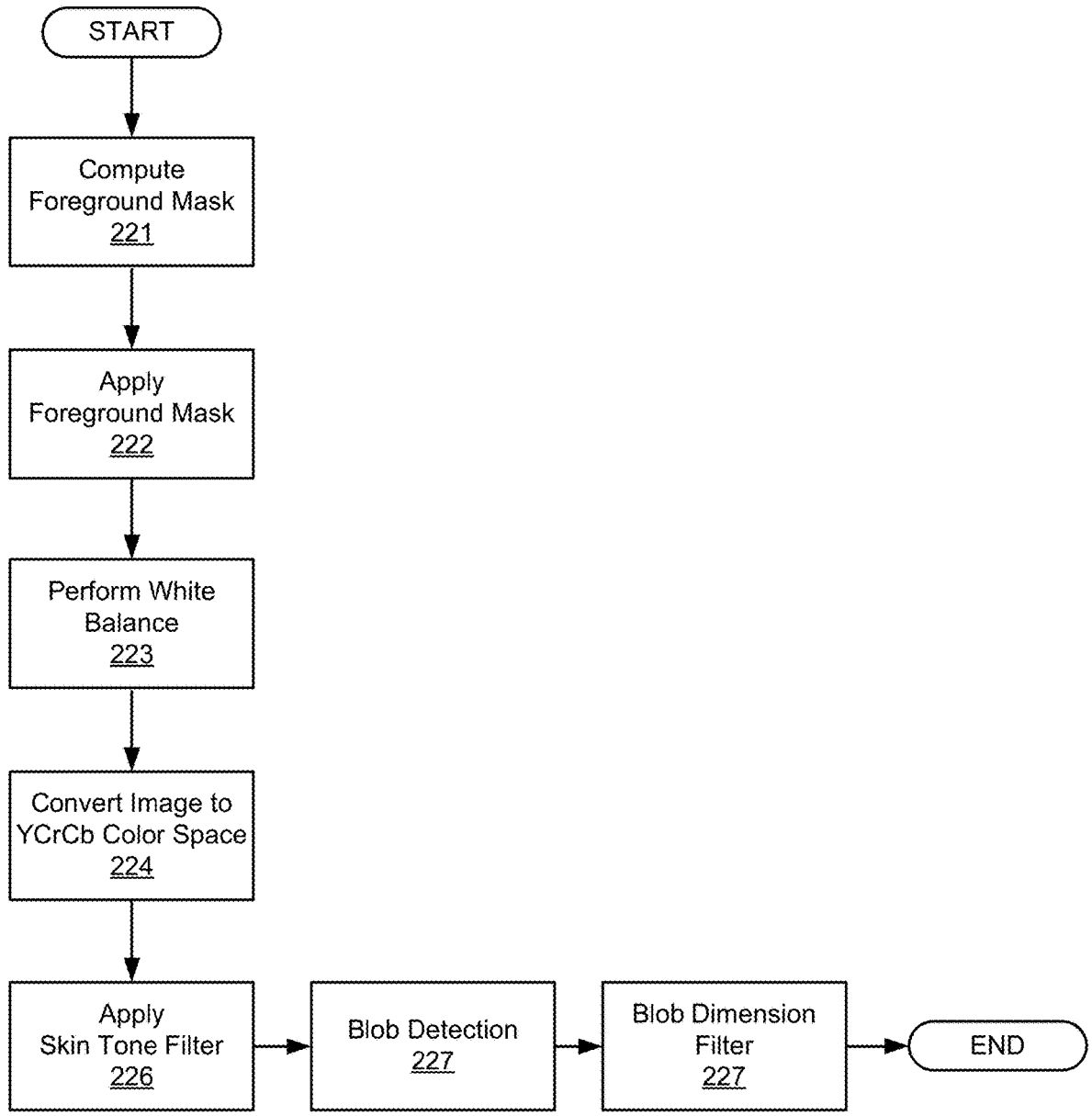

FIG. 2C shows example details of Step 203 discussed above in FIG. 2A. In one or more embodiments, a skin tone filter is used for detecting a hand candidate to narrow down a search area prior to applying more computationally intensive operations to differentiate the hand candidate from other objects. In other words, use of the skin tone filter reduces computing resource requirements to achieve real-time performance. Skin tone detection is based only on color components and is resistant to variations in luminance, i.e., the darkness level of the skin.

Referring to FIG. 2C, during runtime when a finger press is expected from the user, each input frame in the live video stream is processed as the following. Initially in Step 221, a foreground mask is computed by comparing the frame against the background frame derived from the initialization process described above. Foreground pixels are defined as those having pixel values that differ significantly from that of the background pixels at the same location. In one or more embodiments, within the foreground mask, the value is set to 255 for foreground pixels and 0 for all other pixels.

In Step 222, the foreground mask is applied by performing a bitwise AND operation between the input frame and the foreground mask. In addition, a low-pass filter is applied to blur the image. Further, white balance of the image is performed using the white balance parameters obtained during the initialization process depicted in FIG. 2B above (Step 223). After the white balancing, the image is converted from RGB space to YCrCb space to isolate luminance from color components (Step 224).

In Step 226, the skin tone color filter and a skin tone mask are applied to the white balanced image in the YCcCb space, where pixel values within the skin tone range are set to 255, and remaining pixel values are set to 0. A morphological erosion is performed to remove speckle like noise, and a morphological dilation is performed to fill holes.

In Step 227, connected components are detected within the output image from Step 226 to form blobs. Blobs having dimensions within a pre-set range and overlapping with preconfigured finger-press detection region(s) are retained (Step 227). Accordingly, each of the retained blobs is considered a hand candidate.

Figure 2D:
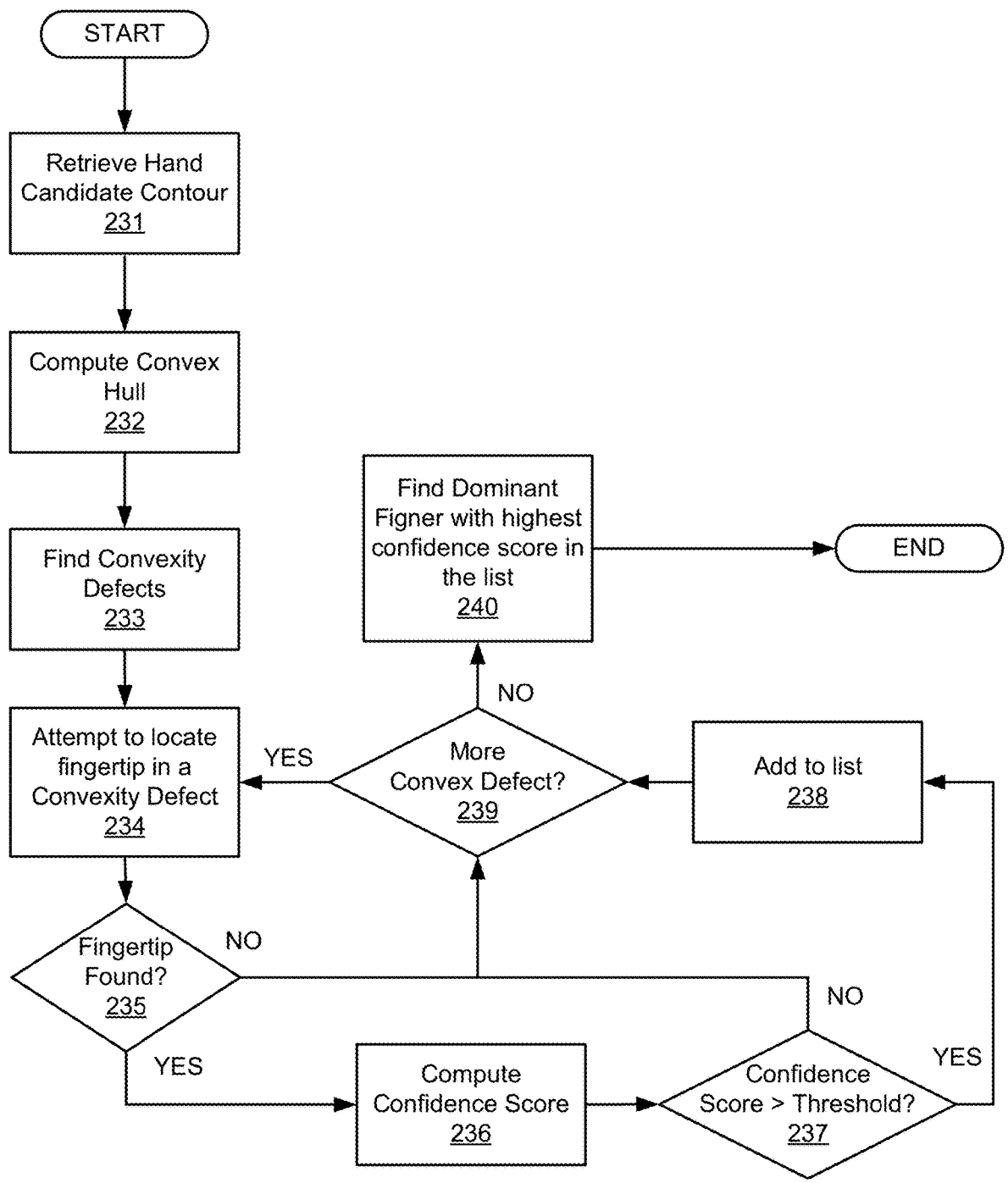

FIG. 2D shows example details of Step 204 discussed above in FIG. 2A. In particular, each hand candidate detected above is analyzed to find fingers and a dominant fingertip. In one or more embodiments, to identifying finger candidates, the contour of a hand candidate is followed to search for protruding feature(s) having a width and length within a predefined set of criteria, e.g., a width between 0.25 and 1.25 inches, and a length exceeding 1 inch. The finger candidates are identified without assuming any particular shape of the protruding feature(s) or the posture of the finger. For example, the finger may be straight or curved, and may be extended or closed into a fist. Furthermore, only one finger in a pointing position is needed to detect the finger press.

Referring to FIG. 2D, to detect the finger candidate, an exterior contour of the hand candidate is extracted (Step 231) to compute the convex hull of the contour (Step 232). Accordingly, convexity defects in the contour are detected (Step 233). If the number of convexity defects is greater than 1 in Step 233, Steps 234 through 239 are repeated for each convexity defect along the hand candidate contour in either a clockwise or counter-clockwise order.

In Step 234, a convexity defect is analyzed to detect a fingertip. First, the length of two edges c1 and c2, as discussed above, are calculated and denoted as d1 and d2, respectively. If either of d1 or d2 is greater than a pre-set minimum finger length threshold, it is likely that d1 or d2 is an edge of a finger and the convexity defect is a valid convexity defect. If d1 and d2 are both less than the pre-set minimum finger length threshold, or if the defect depth is less than a pre-set minimum threshold, the convexity defect is considered trivial and is ignored.

For each valid convexity defect, e2 of the convexity defect is compared with e1 of a subsequent convexity defect. If the distance between the two edges is within the threshold for maximum finger width, the two edges form a finger candidate. The finger candidate (311a) depicted in FIG. 3B as described above is an example of the finger candidate detected in this manner.

When an edge is not matched with another qualified edge such as in the hand candidate B (313) depicted in FIG. 3C where a neighboring finger is folded into a fist, or when no valid convexity defects exist such as in the hand candidate C (321) depicted in FIG. 3C, the process below is followed in an attempt to search for a single finger and a corresponding fingertip. The process is described based on the example shown in FIG. 3C.

Examine the minimum bounding rectangle minRect of the hand candidate, if the dimension of minRect is within a set criteria, continue to the next step. Otherwise, terminate processing for this candidate. In the example, the hand candidate B (313) and the hand candidate C (321) have respective minRect meeting the set criteria. Accordingly, the process searches for fingertip candidates on the border of each minRect.

If minRect is on the border of the image, the process finds the intersection point(s) of the contour with a short dimension of minRect, and is farthest away from an image border. If more than one intersection points are found, the one in the middle is designated as a fingertip candidate. The fingertip candidate exists on each of the hand candidate B (313) and the hand candidate C (321), and are denoted as "tip" in FIG. 3C. In other examples, if minRect is not on the border of the image, the process collects all intersection points between the convex hull and minRect short edges. The short edge with the least number of intersection points is chosen as the most likely edge where the fingertip lies. On that edge, if more than one intersection points are found, the one in the middle is designated as a fingertip candidate.

In each of the hand candidate B (313) and the hand candidate C (321) where a fingertip is located, the process estimates the width of the finger at two different locations along each edge of the finger at a certain distance (e.g., 0.5 inch and 1 inch) away from the fingertip. If the widths measured at both locations are within a pre-set finger width range, representing higher quality of the finger candidate, the finger candidate is accepted. Furthermore, if width measured at the location farther from the fingertip is greater than a width measured at the location closer to the fingertip, further representing higher quality of the finger candidate, a higher confidence score is awarded as described below in Step 236. If no finger candidate or fingertip is found, the process proceeds to Step 239.

In Step 236, a confidence score is calculated for the finger candidate, using a combination of factors such as width estimation (corresponding to a finger quality measure), whether both edges are present (e.g., presence of neighboring finger candidate(s)), whether there is a well-formed fingertip (corresponding to fingertip quality measure), etc. The final confidence score (C) is a weighted sum of the sub-scores as shown in Eq (1) below, where N is the total number of subscores, $a_n$ and $S_n$ are weight and sub-score of the $n^{th}$ contributing factor, respectively.

$$C = \sum_{n=1}^{N} (a_n S_n) \quad \text{Eq (1)}$$

In an example implementation below, one of the sub-score S(w) for finger width (w) is defined as Eq (2) below. In this example implementation, 0.5 is the mean width that corresponds to the maximum sub-score of S(w)=1. As w deviates further from the mean (0.5), the sub-score S(w) decreases and asymptotes to 0. The divisor (0.01 in this example) controls how fast the sub-score decreases.

$$S(w) = e^{\left(-\frac{(w-0.5)^2}{0.01}\right)} \quad \text{Eq (2)}$$

TABLE 1 below summarizes example sub-scores as factors contributing to the overall confidence score (C) in an example implementation. The first, second and third rows of TABLE 1 may correspond to one or more finger quality measure and fingertip quality measure. The fourth row of TABLE 1 may indicate whether neighboring finger candidate(s) is present.

TABLE 1

| Name | Weight | Sub-score Calculation |
|---|---|---|
| Finger width | 1 | $S(w) = e^{\left(-\frac{(w-0.5)^2}{0.01}\right)}$ |
| Number of minor Convexity defects | 1 | S(m) = {1, m ∈ [1, 5] 0.5, elsewhere} |
| Width taper toward tip | 0.5 | S(t) = {1, width taper toward tip 0.25, otherwise} |
| Symmetry (Major convexity defects on both sides ) | 0.5 | S(s) = {1, symmetry present 0.75, otherwise} |

Based on TABLE 1, the total confidence score is computed as Eq (3) below.

$$C = S(w) + S(m) + 0.5 S(t) + 0.5 S(s) \quad \text{Eq (3)}$$

If the confidence score of the finger candidate exceeds a pre-set threshold, the finger candidate is added to a list (Step 238). If no finger candidate exceeds the pre-set threshold, the method proceeds to Step 239.

In Step 239, a determination is made as to whether there are more convexity defect to process. If yes, the process returns to Step 234. If no, the process proceeds to Step 240 where the dominant fingertip is chosen as the one with the highest confidence value (Step 240).

FIG. 2E shows example details of Step 205 discussed above in FIG. 2A. In one or more embodiments, a 2D camera is used in the PIC, which is not able to directly determine with certainty that the user's finger is in contact with the surface. In such embodiments, the finger press is inferred based on the motion of the user's finger. The inference is based on that an intentional press involves a pause in movement trajectory of the finger.

Referring to FIG. 2E, initially in Step 251, all fingertip locations detected from the process described above are iteratively added to a sequence of locations along with timestamps when the detection occurs. Accordingly, the velocity of the fingertip movement is calculated at each time point (Step 252). A finger press detection state machine (253) is traversed based on the rules listed in TABLE 2 while Step 251 and Step 252 are iteratively (i.e., repeatedly) performed.

TABLE 2 a. Initially, the state machine is in an Unknown state
b. When the first fingertip location is received, the state machine enters "Moving" state
c. If the velocity is lower than a "pause threshold" .
   i. If current state is "Moving", the state machine enters "Pause" state, and records current time (Tp).
   ii. If current state is "Paused", compute time lapse since Tp (L)
      1. If L is less than a "pause duration threshold" (Dp = 200 milliseconds), stays in pause state
      2. If L > Dp, enters "Pressed" state" , and output "Finger press Down" event.
   iii. If current state is "Pressed", stay in "Pressed" state.
d. If the velocity is greater than a "pause threshold"
   i. If current state is "Moving", the state machine stays in "Moving" .
   ii. If current state is not in "Moving"
      1. If velocity is greater than a "Move" threshold (which is higher than "Pause threshold" as a hysteresis measure), the state machine enters "Moving" state. A "Finger Press Up" event is raised if current state is "Pressed".
      2. If velocity is less than "Move threshold", the state machine stays in current state.
e. When there is long time elapse since the last fingertip was received, enter "Unknown" state.

An example of pause threshold is 0.25 inch during a processing interval (e.g. 66 milliseconds). The frame interval (i.e., the interval between adjacent frames in the live video stream) may be adjusted based on the current processing load of the system, and the interval is increased as the load on the system is increased. The frame interval typically ranges from 33 to 99 milliseconds.

FIGS. 3A-3D show an implementation example in accordance with one or more embodiments of the invention. The implementation example shown in FIGS. 3A-3D is based on the system and method flowcharts described above in reference to FIGS. 1 and 2A-2E. In one or more embodiments of the invention, one or more of elements shown in FIGS. 3A-3D may be omitted, repeated, and/or organized in a different arrangement. Accordingly, the scope of the invention should not be considered limited to the specific arrangement of elements shown in FIGS. 3A-3D.

Various details of FIG. 3A-3D have been described along with the description of FIG. 1 above. In one or more embodiments, the example implementation shown in FIGS. 3A-3D corresponds to a projected user interface equipped with a camera/projector pair, where a user can use one or more fingers to interact with a projected button on a generic physical surface (such as a table or a wall) in the absence of a mouse or touch screen. For example, referring to FIGS. 3A and 3D, in response to detecting the user finger press within the location (334) where the location (334) overlaps the icon (303), the application receives a notification of the detected finger press over the icon (303), in a similar way a mouse click event is handled by a conventional user interface. In response to the notification, the application performs a pre-determined task corresponding to the icon (303) without relying on dedicated user interface devices such as mouse or touch sensors.

Figure 4:
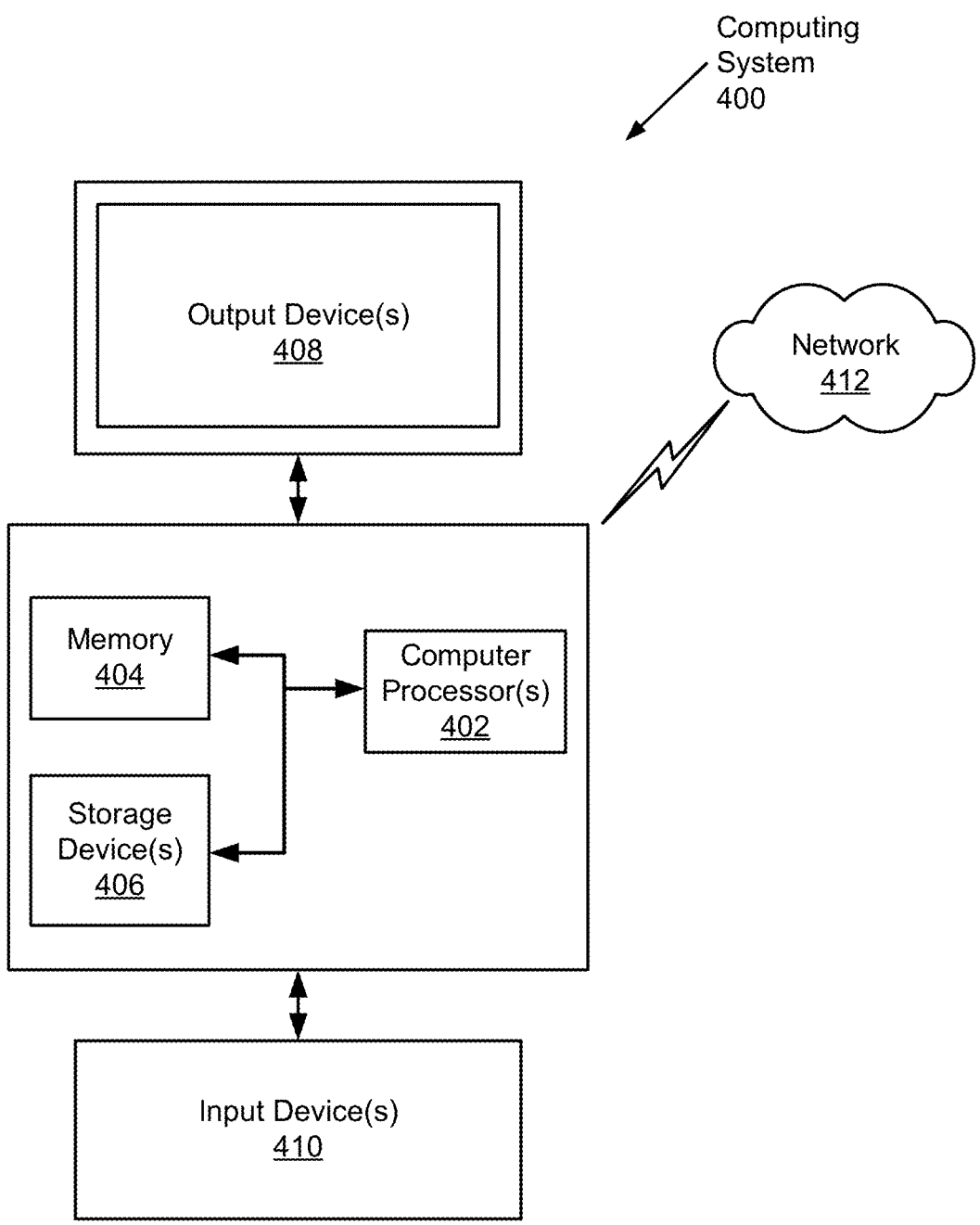
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages: the ability to detect a user's finger press based on low resolution imagery (e.g., live video) streamed from generic camera(s) without dedicated hardware; the ability to eliminate/reduce (by using human skin tone and hand contour) false hand detection due to presence of other objects in the button region; the ability to eliminate/reduce (by analyzing movement of the hand to ensure that the user has briefly paused at a location for a certain duration before a "press" event is raised) potential false triggers by the presence of hand or arm movements under the camera that are not intended to be a button press; the ability to detect the button press with real-time performance since the response time is immediate without latency; and the ability to expand the system by adding one or more cameras (2D or 3D) to improve detection accuracy by using depth information, and/or to recognize additional variety of hand gestures.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to detect a finger press in an augmented reality (AR) workspace, comprising:
    obtaining, using an image sensor, an image of the AR workspace, wherein the image comprises an icon of a graphic user interface (GUI), wherein the GUI is hovered over by a hand of a user;
    obtaining, using the image sensor, a background image of the AR workspace, wherein the background image comprises the icon;
    extracting, by a computer processor based at least on a skin tone color filter, a hand candidate from the image of the AR workspace, wherein the extracting the hand candidate comprises:
        comparing the image and the background image to generate a foreground mask; and
        extracting, using a predetermined skin tone filter and the foreground mask, and based on white balance parameters of the background image, connected color components from the image;
        wherein the hand candidate is selected from the connected color components based on a pre-determined dimension criterion;
    extracting, by the computer processor based on a pre-determined confidence measure, a finger candidate from a contour of the hand candidate; and
    detecting, by the computer processor based on a location of the finger candidate with respect to the icon of the GUI, the finger press performed by the hand of the user.

2. The method of claim 1, further comprising:
    obtaining, using the image sensor, a live video stream of the AR workspace, wherein the image is a frame of the live video stream;
    determining, based at least on the location of the finger candidate extracted from the image, a sequence of fingertip movement velocities from the live video stream; and
    determining, based on the sequence of fingertip movement velocities, a pause duration of the finger hovering over the icon of the GUI,
    wherein detecting the finger press is based on the pause duration exceeding a pre-determined pause threshold.

3. The method of claim 1, wherein extracting the finger candidate comprises:
    extracting a plurality of convex defects from the contour of the hand candidate,
    wherein the pre-determined confidence measure comprises a distance between adjacent convex defects of the plurality of convex defects and a pre-determined finger width threshold,
    wherein the finger candidate comprises a pair of adjacent convex defects with a corresponding distance within the pre-determined finger width threshold.

4. The method of claim 3, wherein the pre-determined confidence measure further comprises a finger quality measure, a fingertip quality measure and a presence of a neighboring finger candidate.

5. The method of claim 1, wherein extracting the finger candidate comprises:
    extracting a plurality of finger candidates from the contour of the hand candidate;
    computing, based on the pre-determined confidence measure, individual confidence scores of the plurality of finger candidates; and
    selecting the finger candidate from the plurality of finger candidates as a dominant finger candidate based on the individual confidence scores.

6. The method of claim 1, wherein extracting the finger candidate comprises:
    generating, based on the contour of the hand candidate, a minimum bounding rectangle of the hand candidate;
    extracting, based on an intersection of the minimum bounding rectangle and at least one selected from a group consisting of a border of the image and the contour of the hand candidate, a fingertip candidate from the contour of the hand candidate; and
    determining an estimated finger width based on the fingertip candidate and the contour of the hand candidate,
    wherein extracting the finger candidate is based on the estimated finger width being within a pre-determined finger width threshold.

7. A non-transitory computer readable medium (CRM) storing computer readable program code to detect a finger press in an augmented reality (AR) workspace, wherein the computer program code, when executed by a computer processor, comprises functionality for:
    obtaining, using an image sensor, an image of the AR workspace, wherein the image comprises an icon of a graphic user interface (GUI), wherein the GUI is hovered over by a hand of a user;
    obtaining, using the image sensor, a background image of the AR workspace, wherein the background image comprises the icon;

extracting, based at least on a skin tone color filter, a hand candidate from the image of the AR workspace, wherein the extracting the hand candidate comprises:
  comparing the image and the background image to generate a foreground mask; and
  extracting, using a predetermined skin tone filter and the foreground mask, and based on white balance parameters of the background image, connected color components from the image;
  wherein the hand candidate is selected from the connected color components based on a pre-determined dimension criterion;
extracting, based on a pre-determined confidence measure, a finger candidate from a contour of the hand candidate; and
detecting, based on a location of the finger candidate with respect to the icon of the GUI, the finger press performed by the hand of the user.

8. The CRM of claim 7, the computer readable program code, when executed by the computer processor, further comprising functionality for:
  obtaining, using the image sensor, a live video stream of the AR workspace, wherein the image is a frame of the live video stream;
  determining, based at least on the location of the finger candidate extracted from the image, a sequence of fingertip movement velocities from the live video stream; and
  determining, based on the sequence of fingertip movement velocities, a pause duration of the finger hovering over the icon of the GUI,
  wherein detecting the finger press is based on the pause duration exceeding a pre-determined pause threshold.

9. The CRM of claim 7, wherein extracting the finger candidate comprises:
  extracting a plurality of convex defects from the contour of the hand candidate,
  wherein the pre-determined confidence measure comprises a distance between adjacent convex defects of the plurality of convex defects and a pre-determined finger width threshold,
  wherein the finger candidate comprises a pair of adjacent convex defects with a corresponding distance within the pre-determined finger width threshold.

10. The CRM of claim 9, wherein the pre-determined confidence measure further comprises a finger quality measure, a fingertip quality measure and a presence of a neighboring finger candidate.

11. The CRM of claim 7, wherein extracting the finger candidate comprises:
  extracting a plurality of finger candidates from the contour of the hand candidate;
  computing, based on the pre-determined confidence measure, individual confidence scores of the plurality of finger candidates; and
  selecting the finger candidate from the plurality of finger candidates as a dominant finger candidate based on the individual confidence scores.

12. The CRM of claim 7, wherein extracting the finger candidate comprises:
  generating, based on the contour of the hand candidate, a minimum bounding rectangle of the hand candidate;
  extracting, based on an intersection of the minimum bounding rectangle and at least one selected from a group consisting of a border of the image and the contour of the hand candidate, a fingertip candidate from the contour of the hand candidate; and
  determining an estimated finger width based on the fingertip candidate and the contour of the hand candidate,
  wherein extracting the finger candidate is based on the estimated finger width being within a pre-determined finger width threshold.

13. A system for detecting a finger press in an augmented reality (AR) workspace, the system comprising:
  a memory; and
  a computer processor coupled to the memory and that:
    obtains, using an image sensor, an image of the AR workspace, wherein the image comprises an icon of a graphic user interface (GUI), wherein the GUI is hovered over by a hand of a user;
    obtains, using the image sensor, a background image of the AR workspace, wherein the background image comprises the icon;
    extracts, based at least on a skin tone color filter, a hand candidate from the image of the AR workspace, wherein extracting the hand candidate comprises:
      comparing the image and the background image to generate a foreground mask; and
      extracting, using a predetermined skin tone filter and the foreground mask, and based on white balance parameters of the background image, connected color components from the image;
      wherein the hand candidate is selected from the connected color components based on a pre-determined dimension criterion;
    extracts, based on a pre-determined confidence measure, a finger candidate from a contour of the hand candidate; and
    detects, based on a location of the finger candidate with respect to the icon of the GUI, the finger press performed by the hand of the user.

14. The system of claim 13, wherein the computer processor further:
  obtains, using the image sensor, a live video stream of the AR workspace, wherein the image is a frame of the live video stream;
  determines, based at least on the location of the finger candidate extracted from the image, a sequence of fingertip movement velocities from the live video stream; and
  determines, based on the sequence of fingertip movement velocities, a pause duration of the finger hovering over the icon of the GUI,
  wherein detecting the finger press is based on the pause duration exceeding a pre-determined pause threshold.

15. The system of claim 13, wherein extracting the finger candidate comprises:
  extracting a plurality of convex defects from the contour of the hand candidate,
  wherein the pre-determined confidence measure comprises a distance between adjacent convex defects of the plurality of convex defects and a pre-determined finger width threshold,
  wherein the finger candidate comprises a pair of adjacent convex defects with a corresponding distance within the pre-determined finger width threshold.

16. The system of claim 13, wherein extracting the finger candidate comprises:
  extracting a plurality of finger candidates from the contour of the hand candidate;
  computing, based on the pre-determined confidence measure, individual confidence scores of the plurality of finger candidates; and selecting the finger candidate from the plurality of finger candidates as a dominant finger candidate based on the individual confidence scores.

17. The system of claim 13, wherein extracting the finger candidate comprises:
generating, based on the contour of the hand candidate, a minimum bounding rectangle of the hand candidate;
extracting, based on an intersection of the minimum bounding rectangle and at least one selected from a group consisting of a border of the image and the contour of the hand candidate, a fingertip candidate from the contour of the hand candidate; and
determining an estimated finger width based on the fingertip candidate and the contour of the hand candidate, wherein extracting the finger candidate is based on the estimated finger width being within a pre-determined finger width threshold.

* * * * *